(12) United States Patent
Muller

(10) Patent No.: US 8,485,658 B2
(45) Date of Patent: Jul. 16, 2013

(54) THERMAL CONDITIONING BUOYANT EYEWEAR RETAINERS

(76) Inventor: Thomas Muller, Tustin, CA (US)

( * ) Notice: Subject to any disclaimer, the term of this patent is extended or adjusted under 35 U.S.C. 154(b) by 43 days.

(21) Appl. No.: 13/038,414

(22) Filed: Mar. 2, 2011

(65) Prior Publication Data

US 2012/0224134 A1 Sep. 6, 2012

(51) Int. Cl.
- *G02C 1/00* (2006.01)
- *G02C 11/00* (2006.01)
- *G02C 5/14* (2006.01)

(52) U.S. Cl.
CPC .............. *G02C 11/00* (2013.01); *G02C 5/143* (2013.01)
USPC .............................. 351/43; 351/123; 351/158

(58) Field of Classification Search
CPC .................................. G02C 11/00; G02C 5/143
USPC .............. 351/41, 43, 111, 121–123, 155, 158
See application file for complete search history.

(56) References Cited

U.S. PATENT DOCUMENTS

| | | | |
|---|---|---|---|
| 3,016,796 A * | 1/1962 | Boothe | 351/43 |
| 5,673,094 A * | 9/1997 | Bahouth | 351/43 |
| 6,860,596 B1 * | 3/2005 | Nolan | 351/43 |
| 2011/0121094 A1 * | 5/2011 | Burney | 239/24 |

* cited by examiner

*Primary Examiner* — Huy K Mai
(74) *Attorney, Agent, or Firm* — Mark Young, P.A.

(57) ABSTRACT

An eyewear retainer includes a flexible elongated arm and a flexible leg extending downwardly from the posterior end of the arm. Elastic bands on the arm receive and engage a wide range of temple arms of eyewear. The leg extends behind a wearer's ear when the temple arm of the eyewear is engaged by the elastic bands. The retainer is buoyant and may include a bulbous buoyancy cell containing a buoyant object on the lateral side of the leg. Thermal medium compartments are attached to the medial side of the retainer arm and retainer leg. Each thermal medium compartment removably contains a thermal medium, such as a cooling medium or a heating medium. A pressure sensitive skin-contacting adhesive is provided on the outer skin-contacting side (i.e., the medial side) of the thermal medium compartment located on the retainer leg. The retainer leg and arm may be comprised of a material including a thermochromic additive and/or a hydrochromic additive configured to change color when the retainer is submerged in water.

19 Claims, 6 Drawing Sheets

SECTION A-A

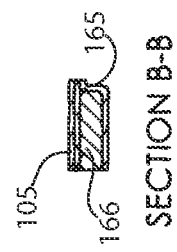
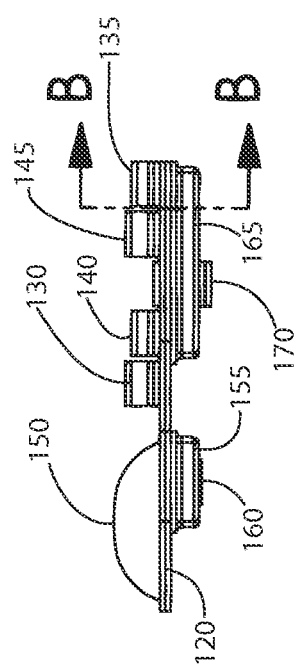

SECTION C-C

THERMAL CONDITIONING BUOYANT EYEWEAR RETAINERS

FIELD OF THE INVENTION

This invention relates generally to eyewear, and, more particularly, to L-shaped retainers that removably attach to the temple arms of eyewear frames, provide padding for comfort, include an adhesive for adhering to the wearer during use, contain compartments for thermal media, and comprise a buoyant structure that provides enough buoyancy to cause the eyewear to float.

BACKGROUND

Eyewear is relatively expensive and for many wearer's a necessity for adequate sight. A problem for many with eyewear is the risk that their glasses will fall off. A fall onto a hard surface may permanently damage lenses. A fall into foliage or bodies of water may result in a complete loss of the eyewear, which will tend to sink. They are difficult to see, especially when submerged in water. Eyewear is frequently lost from boats, piers and docks after they fall into the water. Children's prescription eyeglasses and sunglasses are particularly susceptible to being lost in the water as children are often less conscientious then adults. The expense and inconvenience of replacing eyewear whether they are for adults or children may be considerable, both for corrective prescription and nonprescription versions.

Sunglasses and tinted eyewear are frequently worn by folks who engage in outdoor activities. Often, these activities are conducted in hot or cold weather. Unfortunately, however, the eyewear does nothing to provide thermal conditioning.

The invention is directed to overcoming one or more of the problems and solving one or more of the needs as set forth above.

SUMMARY OF THE INVENTION

To solve one or more of the problems set forth above, in an exemplary implementation of the invention, an eyewear retainer is provided. The eyewear includes a lens assembly and temple arms extending from the lens assembly. The eyewear retainer includes a flexible elongated arm having an anterior end, a posterior end, a longitudinal axis, a medial side and a lateral side. The eyewear retainer also includes a flexible leg extending downwardly from the posterior end of the arm, the leg having a medial side and a lateral side. A plurality of parallel elastic bands is provided on the arm displaced by a determined distance. Each of the elastic bands defines an elastic loop opening for receiving and engaging a temple arm of the eyewear. The leg extends behind a wearer's ear when the temple arm of the eyewear is engaged by the plurality of parallel elastic bands on the arm.

In one embodiment, the arm and leg are made of a buoyant material.

In another aspect of an exemplary embodiment, different size bands are provided to engage different size eyeglass temple arms. For example, a plurality of parallel elastic bands on the retainer arm includes a first pair of bands defining an elastic loop opening of a first width for engaging a temple arm having a width within a first range of widths, and a second pair of bands defining an elastic loop opening of a second width for engaging a temple arm having a width within a second range of widths.

In another aspect of an exemplary embodiment, a buoyant cell is provided on the lateral side of the leg. The buoyant force is sufficient to support not only the retainer, but at least half the weight of the eyewear. With two retainers used on conventional eyewear, the retainers will cause the eyewear to float. To achieve the desired buoyancy, the buoyant cell may include a container or compartment that envelops a buoyant object, such as a closed cell foam material, an integral skinned foam with a nonporous skin, a bladder containing a gas or some other flotation device.

In another aspect of an exemplary embodiment, a thermal medium compartment is attached to the medial side of the retainer arm, and a thermal medium compartment is attached to the medial side of the retainer leg. Each thermal medium compartment contains a thermal medium, such as a cooling medium or a heating medium. Each thermal medium compartment may have a closable opening through which the thermal medium may be inserted and removed.

In another aspect of an exemplary embodiment, a skin-contacting adhesive is provided on the outer skin-contacting side (i.e., the medial side) of the thermal medium compartment located on the retainer leg. The skin contacting adhesive may be a pressure sensitive adhesive strip covered by a releasable liner.

In another aspect of an exemplary embodiment, the retainer leg and arm are comprised of a material including a thermochromic additive and/or a hydrochromic additive configured to change color when the retainer is submerged in water.

BRIEF DESCRIPTION OF THE DRAWINGS

The foregoing and other aspects, objects, features and advantages of the invention will become better understood with reference to the following description, appended claims, and accompanying drawings, where:

FIG. 3 is a bottom view of an exemplary buoyant eyewear retainer according to principles of the invention; and FIG. 4 is a view of section B-B of the exemplary buoyant eyewear retainer according to principles of the invention as shown in FIG. 3.

Those skilled in the art will appreciate that the figures are not intended to be drawn to any particular scale; nor are the figures intended to illustrate every embodiment of the invention. The invention is not limited to the exemplary embodiments depicted in the figures or to the components, configuration, shapes, relative sizes, ornamental aspects or proportions shown in the figures.

DETAILED DESCRIPTION

Figure 1:
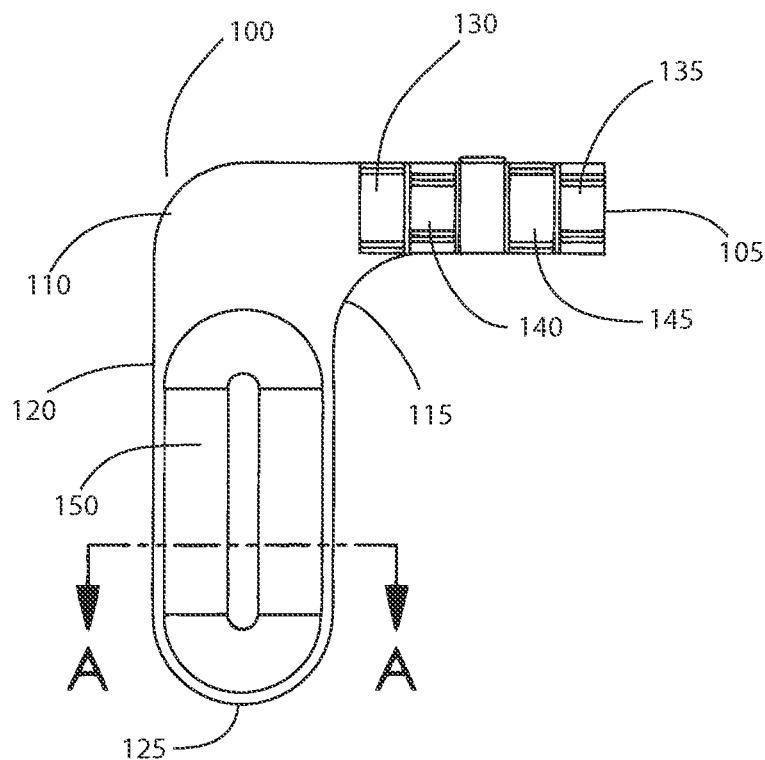
FIG. 1 is a lateral side view of an exemplary buoyant eyewear retainer according to principles of the invention.

Referring to FIG. 1, a lateral side view of an exemplary buoyant eyewear retainer 100 according to principles of the invention is shown. The retainer 100 is a generally L-shaped structure comprising a horizontal arm 105 and a vertical leg 120 extending downwardly from the posterior end of the horizontal arm 105, with curved posterior and anterior angles 110, 115 defining a transition from the horizontal arm 105 to the vertical leg 120, respectively. The horizontal arm 105 is configured to attach to the temple arm of eyewear. The vertical leg 120 extends downwardly behind the ear of a user, thereby substantially resisting unintended removal of the eyewear. The vertical leg ends with a curved terminal end 125.

Also shown in FIG. 1 is a buoyant cell 150. The buoyant cell is a bulbous compartment that contains a buoyant object. The buoyant object may comprise a closed cell foam material, an integral skinned foam with a nonporous skin, a bladder inflated with a gas such as air, another type of gas-containing container with a net specific gravity less than 1, i.e., with a density less than that of water, a non-absorbent material with a specific gravity lower than 1, or any other object that exhibits adequate buoyancy, such as a cork. Closed cell foams do not have interconnected pores. Integral skin foam, also known as self-skin foam, is a type of foam with a high-density skin and a low-density core. Neoprene® is the DuPont trademark for its brand of closed cell polychloroprene foamed with nitrogen gas.

In a preferred embodiment, the entire retainer 100 is comprised of a buoyant material, such as, but not limited to, closed cell foam. Therefore, the contents of the buoyant cell 150 and the buoyant structure of the retainer 100 produce buoyancy. The buoyancy, i.e., the upward acting force, should be sufficient to oppose the sum total of the retainer's weight and at least half of the eyewear's weight. Two retainers will be used. Therefore, each of the two retainers must only oppose half of the eyewear weight, in addition to the weight of the retainer itself. Thus, the composition and size of the retainer 100, the buoyant cell 150 and its contents may vary to achieve the desired buoyancy.

Typical eyewear may weigh from about 0.5 to 1.5 ounces, depending upon the configuration and style of frames and lenses. Some eyewear with glass lenses or heavy frames may weigh considerably more. In an exemplary embodiment, an approximately 30 mL bladder of air will provide sufficient buoyancy to keep most eyewear afloat. However, the invention is not limited to buoyant bladders or to the aforementioned volume.

The horizontal arm 105 includes resilient elastic bands 130-145 for attaching to the temple arms of eyewear. The eyewear arms slide through the elastic bands. A pair of large bands 130, 145 is provided for wide arms. The large bands 130, 145 define stretchable loop openings suitable for receiving and engaging a wide range of wide arms. A pair of small bands 135, 140 is provided for narrow arms. The small bands 135, 140 define stretchable loop openings suitable for receiving and engaging a wide range of narrow arms. When the large bands 130, 145 are used, the small bands 135, 140 may be compressed between the engaged temple arm of the eyewear and the horizontal arm 105 of the retainer 100.

Figure 2:
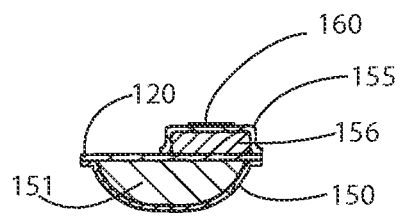
FIG. 2 is a view of section A-A of the exemplary buoyant eyewear retainer according to principles of the invention as shown in FIG. 1.

Referring now to FIG. 2 is a view of section A-A of the exemplary buoyant eyewear retainer according to principles of the invention as shown in FIG. 1. The section shows the buoyant cell 150 and its buoyant contents 151, as discussed above. The section also shows a medial side feature, namely a thermal medium compartment 155, a contained thermal medium 156, and an adhesive strip 160.

The thermal medium compartment 155 envelops a thermal medium. The thermal medium 156 contained in the compartment 155 either cools or warms the wearer, as the need may be. The compartment 155 may be comprised of an elastic material suitable for containing thermal media of various sizes. The compartment may be impervious to water, to prevent melted ice water from dripping onto the user. Alternatively, the compartment may be porous (e.g., cloth), allowing moisture to escape from the compartment 155. The compartment 155 may have a resealable opening (e.g., a flap with a snap closure or a hook and loop fastener closure) or may permanently contain a reusable medium. Other compartment 155 configurations, such as pouches, may be utilized without departing from the scope of the invention. The particular structure of the compartment is not particularly important, so long as it is suitable for containing the thermal medium, allows efficient heat transfer and is comfortable when applied against a user's skin.

By way of example and not limitation, the medium may comprise ice, an ice pack, a gel pack or another substance suitable for absorbing considerable amounts of heat. A typical gel pack comprises a plastic sack of refrigerant gel containing hydroxyethyl cellulose or vinyl-coated silica gel, which is usually non-toxic, and absorbs a considerable amount of heat due to a high enthalpy of fusion. One type of ice pack is stored at room temperature and uses an endothermic reaction to cool down quickly. By way of example, the ice pack may comprise a breakable tube of ammonium nitrate or ammonium chloride in water. When the tube is broken, its contents mix and react with the water, initiating an endothermic reaction. The reacting mixture absorbs enough energy to produce a cooling effect.

Figure 17:
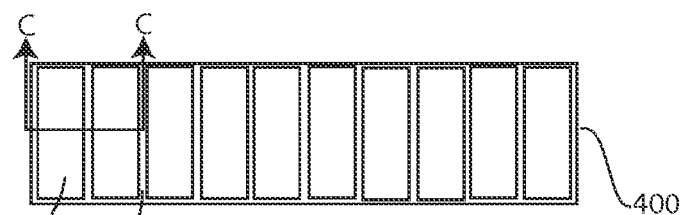
FIG. 17 is a plan view of exemplary thermal media strip for use with exemplary buoyant eyewear retainers according to principles of the invention.
Figure 18:
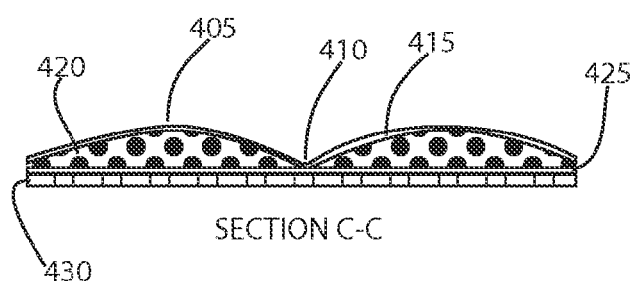
FIG. 18 is a section view of the exemplary thermal media strip of FIG. 17 for use with exemplary buoyant eyewear retainers according to principles of the invention.

Yet another thermal medium comprises a flexible sheet comprising cells of superabsorbent polymers, which can be hydrated and either cooled or heated to provide a desired thermal effect. By way of illustration and not limitation, FIG. 17 shows a strip 400 comprising a plurality of thermal media cells 405. Each cell is separated from an adjacent cell by a border 410 that may be cut without releasing contents of the cell. As shown in FIG. 18, the hydratable sheet may comprise a backing sheet 430, preferably of an impervious plastic sheet material (such as, for example, polyester film), and an upper, porous sheet 415 (such as, for example, non-woven polypropylene), with a preferably tacky, sealant or adhesive layer 425 [e.g. 22.5% ethylene-methyl-acrylate (EMA)], about one mil (0.0001") thick, to affix and seal the two sheets together along longitudinally and laterally extending lines forming borders and defining a series of cells 405. Contained within each cell 405 is an appropriate amount of superabsorbent, polymer powder, such as, but not limited to, doubly-cross-linked sodium polyacrylate. The polymer powder 420 initially occupies only a small amount, about ten to twenty-five percent (10%-20%), preferably about fifteen (15%) percent, of the total interior volume of the cell 405. This allows room for the substantial, e.g., approximately ten (10)-fold, expansion which occurs as the polymer is hydrated by being soaked in water, which the polymer superbly absorbs. In the hydrated state, the hydrated polymer expands and fills out the interior of the cell 405. The medium may then be heated or chilled as desired. When ready to use, the heated or chilled medium may be inserted into the thermal medium compartment 155.

FIG. 3 is a bottom view of an exemplary buoyant eyewear retainer according to principles of the invention. As shown, the medial side of the horizontal arm 105 of the retainer 100 may also include a thermal medium compartment 165, which envelopes a thermal medium 166, as shown in FIG. 4. The compartment 165 may be comprised of an elastic material suitable for containing thermal media of various sizes. The compartment may be impervious to water, to prevent melted ice water from dripping onto the user. Alternatively, the compartment may be porous, allowing moisture to escape from the compartment 165. The compartment may have a resealable opening (e.g., a zippered opening or a flap with a snap closure or a hook and loop fastener closure) or may permanently contain a reusable medium. A hook and loop fastener 170, such as but not limited to a Velcro® brand closure, is conceptually illustrated in FIGS. 6 and 7. There is no such closure illustrated on the thermal medium compartment 155 of the leg 120 because gravity and friction may be used to retain the thermal medium 156 in the compartment 155. However, such a closure may optionally be used with the compartment 155 of the leg 120. The thermal medium 166 contained in the compartment 165 either cools or warms the wearer. The thermal media discussed above in reference to the compartment 155 on the medial side of the leg 120 may be utilized with the compartment 165.

An adhesive strip 160 is provided on the medial side of the horizontal arm 105. It is in a position that is unlikely to catch hair. The adhesive strip 160 is shown on the medial side of the thermal media compartments 155. The adhesive strip, releasably secures the retainer to the wearer's skin. Because the retainer is flexible, it readily bends to accommodate contours of the user's physique, allowing the adhesive strip to bond to the user's skin.

An adhesive suitable for use with the adhesive strip 160 can be any of the conventional adhesives typically used in skin-contacting applications. Examples of such adhesives are disclosed in U.S. Pat. Nos. Re. 24,906, 3,389,827, 4,112,213, 4,310,509, 4,323,557, and 4,737,410, each of which is hereby incorporated by reference. By way of example and not limitation, the adhesive may comprise a mixture of at least one cross-linkable pressure sensitive adhesive component and at least one non-cross-linkable pressure-sensitive adhesive component, wherein the amount of each of said components is such that the resultant adhesive can adhere to human skin for a period of up to about few days but can be removed without causing trauma to the skin. Numerous pressure sensitive adhesives have been developed that are effective for a day or two, such as bandages to cover skin wounds or abrasions, or transdermal patches that deliver a drug or other therapeutic agent to or through the skin. Cross-linkable adhesives useful in making the adhesive composition of the present invention include medical grade acrylic cross-linkable adhesives. As used herein, "cross-linkable adhesive" refers to an adhesive provided as a solvent-based solution that contains a cross-linking agent. As provided, the adhesive is uncross-linked. When the solution is dried to remove the solvent, the cross-linker is activated and the cross-linking of the adhesive occurs. Suitable acrylic adhesives include acrylate-vinylacetate self-curing pressure sensitive adhesives. Prior to drying, the cross-linkable acrylic adhesive is mixed with a second, non-cross-linkable acrylic adhesive. As used herein, a "non-cross-linkable adhesive" refers to an adhesive provided as a solvent-based solution that does not contain a cross-linking agent. Preferably the solution of non-cross-linkable adhesive comprises the same polymer as provided in the solution of the cross-linkable adhesive. By blending the two solvent-based adhesive solutions prior to drying, the cross-linker in the one solution, in essence, is diluted, such that the final product is a combination of cross-linked and non-cross-linked adhesives, with a blend of the properties of each adhesive taken independently. The particular properties of the product will depend on the ratio of cross-linkable adhesive to non-cross-linkable adhesive. A variety of ratios can be used to make an adhesive product having the balance of properties (duration of wear vs. removability) desired for this invention; generally, the ratio of cross-linkable adhesive to non-cross-linkable adhesive is within the range of 75:25 to 25:75 weight:weight.

Release liners are used to cover the surface of the pressure-sensitive adhesive during storage. The release liner is removed and discarded from the composition to expose the adhesive which will be applied to the user's skin. Suitable release liners include those known in the art for use with pressure sensitive adhesive compositions. For example, the release liner can comprise a fluorosilicone coated polyester, silicone coated polyester or a UV cured, silicone-coated polyester. The release liner, however, can comprise other materials, including paper or paper-containing layers or laminates, various thermoplastics, polyester films, foil liners, and the like.

Figures 5, 6:
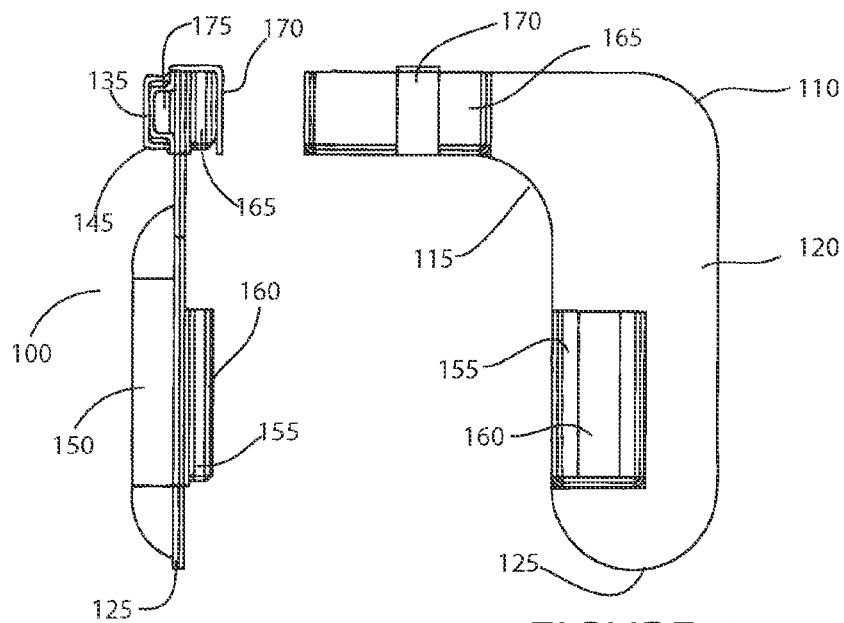
FIG. 5 is an anterior side view of an exemplary buoyant eyewear retainer according to principles of the invention.
FIG. 6 is a medial side view of an exemplary buoyant eyewear retainer according to principles of the invention.

FIG. 5 provides an anterior side view of an exemplary buoyant eyewear retainer according to principles of the invention. The anterior side of the resilient elastic bands 135, 145 for attaching to the temple arms of eyewear is apparent. The eyewear arms slide through the space 175 defined by the elastic bands.

Figure 7:
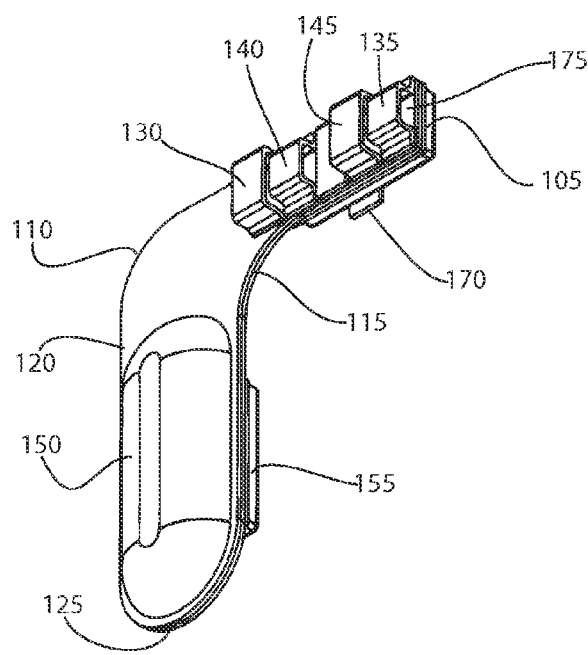
FIG. 7 is a lateral bottom perspective view of an exemplary buoyant eyewear retainer according to principles of the invention.
Figure 8:
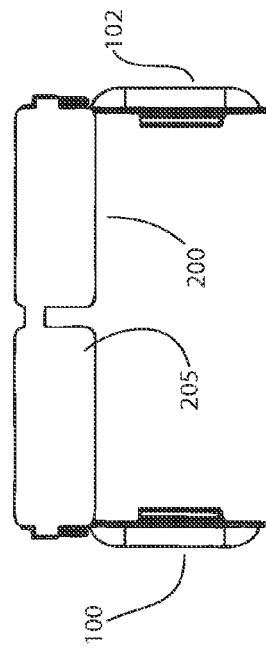
FIG. 8 is a lateral side view of an exemplary buoyant eyewear retainer on a temple arm of eyewear according to principles of the invention.
Figure 9:
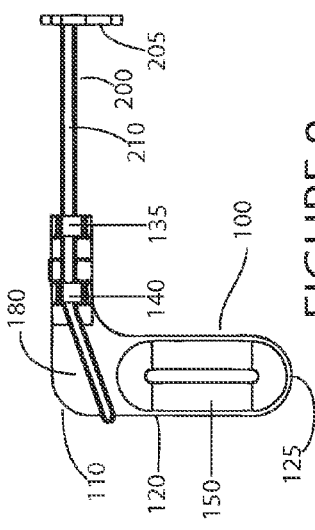
FIG. 9 is an anterior side view of exemplary buoyant eyewear retainers on temple arms of eyewear according to principles of the invention.
Figure 11:
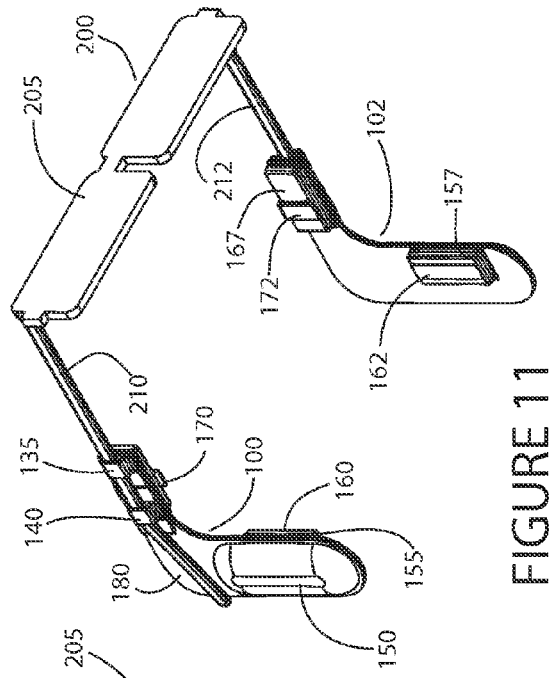
FIG. 11 is a perspective view of exemplary buoyant eyewear retainers on temple arms of eyewear according to principles of the invention.
Figure 10:
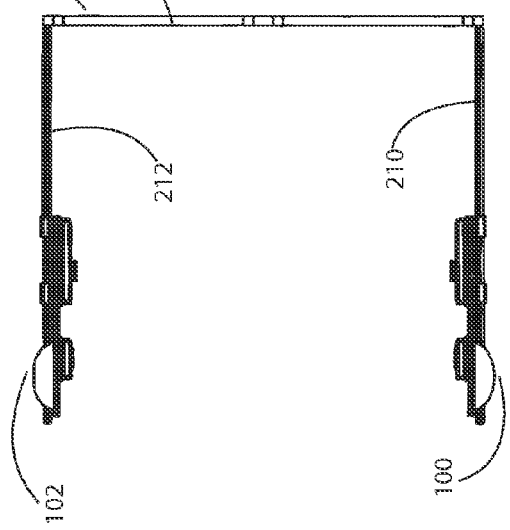
FIG. 10 is a top side view of exemplary buoyant eyewear retainers on temple arms of eyewear according to principles of the invention.
Figure 12:
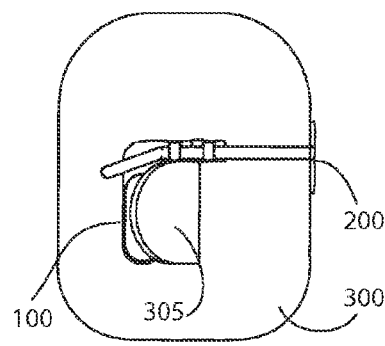
FIG. 12 is a lateral side view of an exemplary buoyant eyewear retainer on a temple arm of eyewear worn by a user according to principles of the invention.
Figure 13:
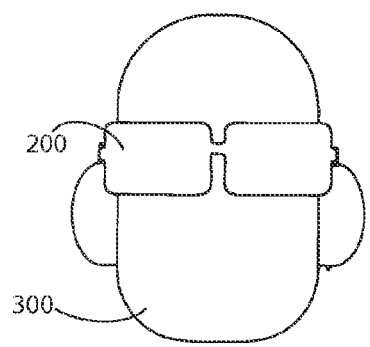
FIG. 13 is an anterior side view of exemplary buoyant eyewear retainers on temple arms of eyewear worn by a user according to principles of the invention.
Figure 14:
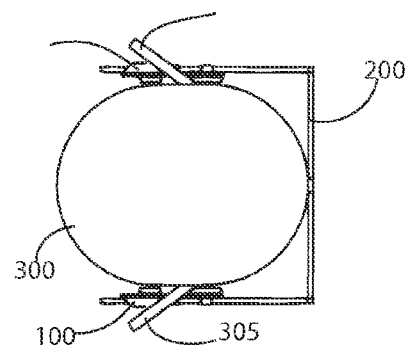
FIG. 14 is a top side view of exemplary buoyant eyewear retainers on temple arms of eyewear worn by a user according to principles of the invention.
Figure 15:
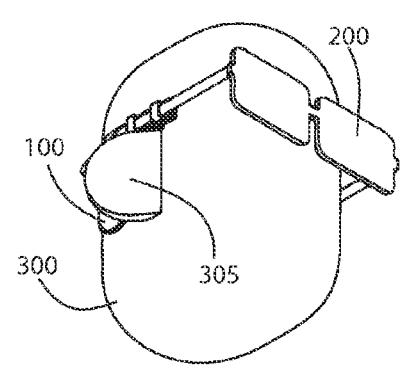
FIG. 15 is an anterior perspective view of exemplary buoyant eyewear retainers on temple arms of eyewear worn by a user according to principles of the invention.
Figure 16:
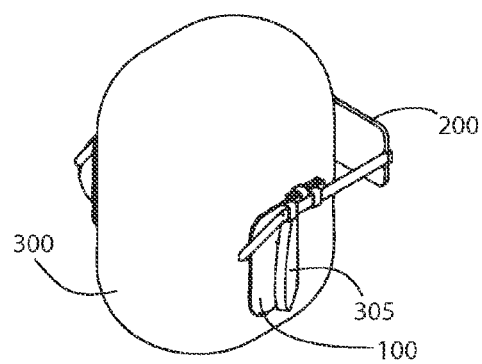
FIG. 16 is a posterior perspective view of exemplary buoyant eyewear retainers on temple arms of eyewear worn by a user according to principles of the invention.

FIG. 6 provides a medial side view of an exemplary buoyant eyewear retainer according to principles of the invention. FIG. 7 provides a lateral bottom perspective view of an exemplary buoyant eyewear retainer according to principles of the invention. The thermal medium compartments 155, 165 and adhesive strip 160 are apparent on the medial side. The L-shaped structure comprising a horizontal arm 105 and a vertical leg 120 extending downwardly from the posterior end of the horizontal arm 105, with curved posterior and anterior angles 110, 115 defining a transition from the horizontal arm 105 to the vertical leg 120, are also apparent. Furthermore, the bulbous shape of the buoyant cell 150 is clearly illustrated.

Referring now to FIGS. 8 through 11, various views of exemplary buoyant eyewear retainers on temple arms 210, 212 of eyewear 200 according to principles of the invention are conceptually shown. While above, a single retainer 100 is described, it is understood that a retainer 100, 102 is provided for each side of a user's head, the right and left side, and, thus, for each temple arm of 210, 212 of the eyewear 200. The lenses 205 are unaffected by the retainers 100, 102. The retainers 100, 102 are mirror images of each other. In other words, the right side retainer 100 has a spatial arrangement that corresponds to that of the left side retainer 102, except that the right-to-left sense on the right-side retainer 100 corresponds to the left-to-right sense on the left-side retainer 102. In all other material respects, each retainer 100, 102 in the pair of retainers is identical the other.

Notably, the terminal ends of the temple arms which bend down slightly behind the ear are not obstructed by the bulbous buoyant cell 150. The planar area 180 between the buoyant cell 150 and the horizontal arm 105 accommodates the terminal ends of the temple arms, without obstruction. This generally planar area 180 is referred to herein as a transition zone. The transition zone 180 comprises a generally planar area between the horizontal arm 105 and the bulbous buoyant cell 150.

Referring now to FIGS. 12 through 16, various view of exemplary buoyant eyewear retainers on temple arms of eyewear 200 worn on the head 300 of a user according to principles of the invention are conceptually illustrated. The bulbous buoyant cell 150 fits behind the prominent rim of the user's ear 305, known as the helix. The vertical leg 120 and bulbous buoyant cell 150 provide a comforting structure that gently contacts the ear 305 and resists unintended removal of the eyewear 200.

Concomitantly, the adhesive strip 160 is releasably adhered to the skin of the wearer. Thus, the adhesive strips resist unintended removal of the eyewear. The adhesive strip also ensures intimate contact between the thermal media container 155 and the user's head, anterior to the ear 305, while the temple arm of the user's eyewear gently presses thermal media container 165 to the user's head, anterior to the temple. This contact facilitates heat transfer between the contained thermal media 156, 166 and the contacted areas of the user's head 300, anterior to the temple and ear. Such thermal conditioning not only enhances comfort, but may also prevent heat stroke and reduce the severity of headaches and migraines. Blood flowing to and from the head 300 is thermally conditioned, i.e., cooled or heated, as the case may be. The thermally conditioned blood travels to and from the heart and organs of the head. During such travel, the thermally conditioned blood imparts thermal conditioning to other blood and organs with which it communicates. The overall effect is thermal conditioning that extends far beyond the specific areas of the head to which the thermal media is applied.

In another aspect of a particular exemplary embodiment, the retainer undergoes a color change when dropped in water. The change in color may be initiated by temperature or chemical reaction with water. By way of example and not limitation, thermochromism may be imparted to the polymer (s) comprising the retainer by doping the polymer(s) with thermochromic additives. All other material properties of the polymer(s) are substantially unchanged. The thermochromic additives are chemically, mechanically and thermally stable in the polymer matrix and withstand the polymer manufacturing or production process.

By way of example and not limitation, the foam be formulated to change color when it reaches a predetermined or lower temperature. This can be accomplished by mixing a thermochromic additive to the base material in an amount that is sufficient to achieve a desired color changing range (i.e., an effective amount). As an example, a mixture of approximately 5% to 30% (pbw) of Matsui International Co., Inc.'s Chromicolor® additive may be introduced to base polymer, to provide a structure that visibly changes color at a determined temperature or lower. Such a color change may facilitate rapid identification of the eyewear lost in water.

As another example, the retainer may be created in a particular color and coated with a hydrochromic coating, which changes repeatedly from white to transparent when wetted with water and changes back to the original white when dried. Therefore, through coating a structure, the structure's color is concealed with white in dried condition and appears when the binder becomes transparent with water. Such Hydro-Chromic White coatings are also available from Matsui International Co., Inc.

These and other thermochromic and hydrochromic additives and coatings may be utilized within the scope of the present invention to facilitate identification and achieve unique aesthetic effects. The invention is not limited to the use of any particular additive, coating or color.

While an exemplary embodiment of the invention has been described, it should be apparent that modifications and variations thereto are possible, all of which fall within the true spirit and scope of the invention. With respect to the above description then, it is to be realized that the optimum relationships for the components and steps of the invention, including variations in order, form, content, function and manner of operation, are deemed readily apparent and obvious to one skilled in the art, and all equivalent relationships to those illustrated in the drawings and described in the specification are intended to be encompassed by the present invention. The above description and drawings are illustrative of modifications that can be made without departing from the present invention, the scope of which is to be limited only by the following claims. Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents are intended to fall within the scope of the invention as claimed.

What is claimed is:

1. An eyewear retainer for eyewear, said eyewear comprising a lens assembly and temple arms extending from the lens assembly, said eyewear retainer comprising:
    a flexible elongated arm having an anterior end, a posterior end, a longitudinal axis, a medial side and a lateral side;
    a flexible leg extending downwardly from the posterior end of the arm, said leg having a medial side and a lateral side;
    a plurality of parallel elastic bands on the arm displaced by a determined distance, each of said elastic bands defining an elastic loop opening for receiving and engaging a temple arm of the eyewear;
    said leg being configured to extend behind a wearer's ear when the temple arm of the eyewear is engaged by the plurality of parallel elastic bands on the arm; and
    a thermal medium compartment attached to the medial side of the arm, said thermal medium compartment containing a thermal medium.

2. An eyewear retainer according to claim 1, said arm and leg comprising a buoyant material.

3. An eyewear retainer according to claim 1, said plurality of parallel elastic bands on the arm comprising a first pair of bands defining an elastic loop opening of a first width for engaging a temple arm having a width within a first range of widths.

4. An eyewear retainer according to claim 3, said plurality of parallel elastic bands on the arm further comprising a second pair of bands defining an elastic loop opening of a second width for engaging a temple arm having a width within a second range of widths.

5. An eyewear retainer according to claim 1, further comprising a buoyant cell on the lateral side of the leg.

6. An eyewear retainer according to claim 5, said eyewear having a determined eyewear weight and said eyewear retainer providing a buoyant force in water equal to at least one half of said eyewear weight.

7. An eyewear retainer according to claim 5, said buoyant cell comprising a container that envelops a buoyant object.

8. An eyewear retainer according to claim 7, said buoyant object comprising a closed cell foam material.

9. An eyewear retainer according to claim 7, said buoyant object comprising an integral skinned foam with a nonporous skin.

10. An eyewear retainer according to claim 7, said buoyant object comprising a bladder containing a gas.

11. An eyewear retainer according to claim 1, further comprising
  a thermal medium compartment attached to the medial side of the leg, said thermal medium compartment containing a thermal medium.

12. An eyewear retainer according to claim 1, said thermal medium comprising a cooling medium.

13. An eyewear retainer according to claim 1, said thermal medium comprising a heating medium.

14. An eyewear retainer according to claim 1, said thermal medium compartment attached to the medial side of the arm including a closable opening through which the thermal medium may be inserted and removed, and said thermal medium compartment attached to the medial side of the leg including a closable opening through which the thermal medium may be inserted and removed.

15. An eyewear retainer according to claim 1, wherein
  the thermal medium compartment attached to the medial side of the leg has an outer side and a skin-contacting adhesive attached to said outer side.

16. An eyewear retainer according to claim 15, wherein
  said skin-contacting adhesive comprises a pressure sensitive adhesive strip covered by a releasable liner.

17. An eyewear retainer according to claim 1, said flexible elongated arm and said flexible leg comprising a material including a thermochromic additive configured to change color when the retainer is submerged in cool water.

18. An eyewear retainer according to claim 1, said flexible elongated arm and said flexible leg comprising a material including a hydrochromic additive configured to change color when the retainer is submerged in water.

19. An eyewear retainer for eyewear, said eyewear comprising a lens assembly and temple arms extending from the lens assembly, said eyewear retainer comprising:
  a flexible elongated arm having an anterior end, a posterior end, a longitudinal axis, a medial side and a lateral side;
  a flexible leg extending downwardly from the posterior end of the arm, said leg having a medial side and a lateral side;
  a plurality of parallel elastic bands on the arm displaced by a determined distance, each of said elastic bands defining an elastic loop opening for receiving and engaging a temple arm of the eyewear;
  said leg being configured to extend behind a wearer's ear when the temple arm of the eyewear is engaged by the plurality of parallel elastic bands on the arm; and
  a thermal medium compartment attached to the medial side of the leg, said thermal medium compartment containing a thermal medium.

\* \* \* \* \*